(No Model.)

A. RUTHENBERG.
CAR BRAKE.

No. 568,959.                     Patented Oct. 6, 1896.

Witnesses.
G. Willard Rich.
Thomas Durant

Inventor.
August Ruthenberg
by Chuncle Smith
his Attorneys.

(No Model.)

A. RUTHENBERG.
CAR BRAKE.

No. 568,959.

2 Sheets—Sheet 2.

Patented Oct. 6, 1896.

Witnesses.
G. Willard Rich.
Thomas Durant

Inventor.
August Ruthenberg

Attorneys

UNITED STATES PATENT OFFICE.

AUGUST RUTHENBERG, OF ROCHESTER, NEW YORK.

CAR-BRAKE.

SPECIFICATION forming part of Letters Patent No. 568,959, dated October 6, 1896.

Application filed March 13, 1896. Serial No. 583,116. (No model.)

*To all whom it may concern:*

Be it known that I, AUGUST RUTHENBERG, of Rochester, in the county of Monroe and State of New York, have invented certain new and useful Improvements in Car-Brakes; and I do hereby declare the following to be a full, clear, and exact description of the same, reference being had to the accompanying drawings, forming a part of this specification, and to the reference-numerals marked thereon.

My present invention has for its object to provide an improved braking mechanism for railway-cars or other vehicles which shall be simple in construction and arranged to insure a positive grip on the wheels or braking-surfaces by the expenditure of a slight amount of power; and it consists in certain improvements in construction and combinations of parts, all as will be hereinafter fully described, and the novel features pointed out in the claims at the end of this specification.

Figure 1:
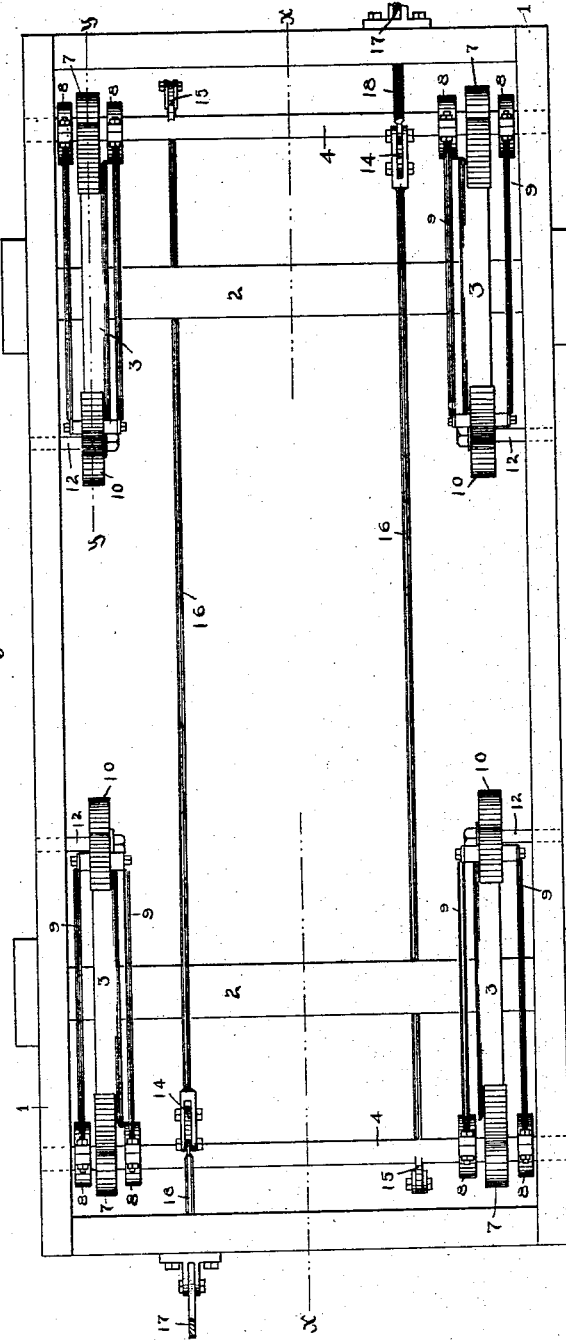
Figure 2:
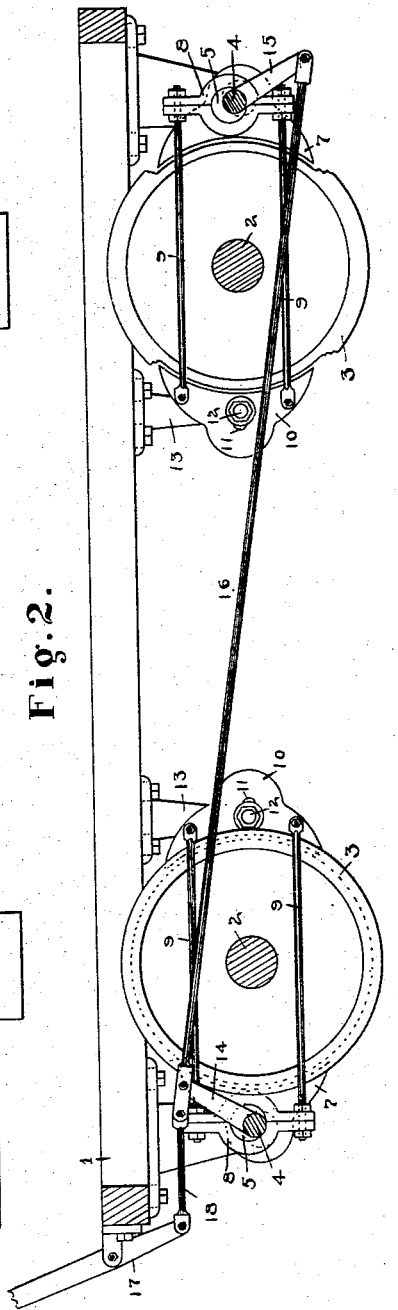
Figure 3:
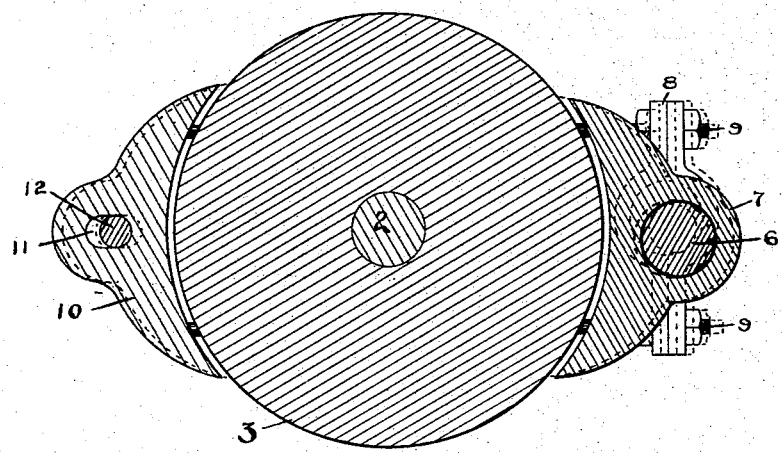
Figure 4:
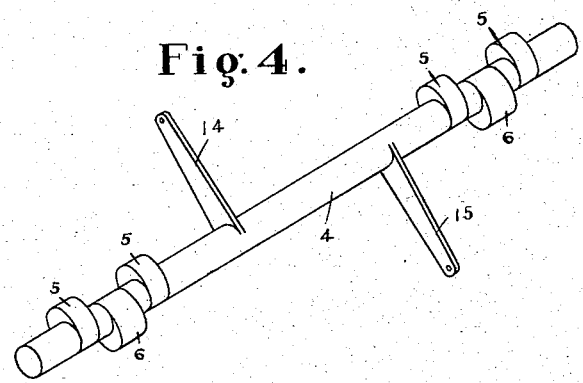

In the drawings, Figure 1 is a plan view of a car-truck, showing the application of my invention thereto; Fig. 2, a longitudinal sectional view on the line x x of Fig. 1; Fig. 3, a sectional view on the line y y of Fig. 1, and Fig. 4 a perspective view of one of the cam-shafts employed for operating the brakes.

Similar reference-numerals in the several figures indicate similar parts.

1 indicates the truck-frame, and 2 the axles, having the wheels 3 on their ends, as usual, said axles being supported in boxes in the truck-frame in the usual or any preferred manner.

4 indicates two cam-shafts arranged, preferably, in the ends of the frame 1 beyond the wheels, being journaled at their ends in suitable bearings in said frame and provided at each end with a pair of cams or eccentrics 5 5 and between each pair with another cam 6, projecting in the opposite direction, the distance between the outer cams 5 being slightly greater than the width of the car-wheel.

7 indicates brake-shoes engaging the outer sides of the wheels, having apertures in which operate the cams 6 on the shafts 4, said brake-shoes being adapted, when the shafts are rotated, to be crowded by the cams against the outer faces of the wheels, and arranged upon the cams 5 of each of the shafts 4 are split sleeves 8, connected by rods 9 with the ends of the inner brake-shoes 10, one of said shoes 10 being arranged to coöperate with the inner side of each of the wheels and having a slot 11 for the passage of a bolt or pin 12, secured to the bracket 13, attached to the under side of the truck-frame. This pin or bolt serves as a support for the inner brake-shoes, but permits their movement toward and from the wheel and a slight rocking movement, if required. Also formed upon or secured to the upper portion of the shafts 4 are arms 14, and upon the lower portion of said shafts are formed or secured arms 15, suitable connecting-rods 16 serving to connect one of the arms 15 with the arm 14 upon the other shaft, as shown particularly in Figs. 1 and 2.

Inasmuch as the cams 5 and 6 upon the shafts 4 are arranged in sets of three, operating upon the brake-shoes of a single wheel, it will be noted that when the shafts are rotated in one direction the brake-shoes 7 and 10 will be drawn together upon opposite sides of the wheel, clamping the latter firmly between them, and by reason of the pivotal connection of the shoes 7 and the cam and the shoes 10 upon the pin 12 said shoes can accommodate themselves to the surface of the wheel and hold it firmly. The rods 16, connecting the opposite sides of the shafts 4, cause the simultaneous operation of said shafts by a direct pull when either one is operated, and while any suitable means may be employed for rotating these shafts, or either of them, I prefer to provide at opposite sides of the frame 1 pivoted operating-levers 17, the lower ends of which are connected by links 18 with the upper arms 14 on the shafts 4, so that the brake may be operated from either end of the car.

This form of brake is particularly adapted for use on street-cars having propelling-motors, for the reason that a large space is left between the wheels for the accommodation of the motor, and the double brake-beams heretofore employed on the inner sides of the wheels are dispensed with.

By means of my improved brake the operator can clamp the wheels tightly when desired to make a sudden emergency stop, or can regulate the pressure between the wheels and shoes to cause a gradual braking, if desired.

While I have shown the shafts 4 as provided with eccentric-cams, it will be understood that cranks similarly arranged would accomplish the same purpose, though the construction would not be as cheap as that shown.

I claim as my invention—

1. In a brake, the combination with the wheel, of a shaft having three cams or eccentrics thereon, a brake-shoe journaled on the central cam, sleeves on the outer cams, a second brake-shoe, and connections between it and the sleeves, substantially as described.

2. In a brake, the combination with a pair of wheels, of a shaft having at each end a set of three cams or eccentrics, a pair of brake-shoes for each wheel, one shoe of each pair mounted directly on the central one of the three cams, sleeves on the two outermost cams of each set, and connections between said sleeves and the other brake-shoe of the pair, substantially as described.

3. In a brake, the combination with a pair of wheels, of a shaft having a set of three cams at each end, a pair of brake-shoes for each wheel arranged on opposite sides thereof, and connections between the central cam of each set and one of the shoes, and between the two outer cams of each set and the other brake-shoe of the pair, substantially as described.

4. In a brake, the combination with the wheel, of a shaft having a set of three cams thereon, the central cam being arranged on the opposite side of the shaft from the other two, a brake-shoe on one side of the wheel operated upon by the central cam, and a second brake-shoe on the other side of the wheel connected to and operated by the outer cams of the set, substantially as described.

5. In a brake, the combination with the wheel, of a shaft having a set of three cams thereon, the central cam being arranged on the opposite side from the other two, a brake-shoe on one side of the wheel operated upon by the central cam, and a second brake-shoe on the other side of the wheel, a support on which said shoe slides and pivots, and connections between the outer cams and the last-mentioned brake-shoe, substantially as described.

6. In a brake, the combination with the wheel, a shaft having a set of three cams thereon, two on one side, and one on the other, of the brake-shoe having the slot, the stationary supporting-pin in said slot, connections between said shoe and the outer cams of the set, and the brake-shoe operated upon by the central cam of the set, substantially as described.

7. In a brake, the combination with the wheel, of a shaft having oppositely-arranged cams thereon, a brake-shoe on one side of the wheel carried by one cam, and a brake-shoe on the opposite side of the same wheel actuated by the other cams, substantially as described.

8. In a brake, the combination with the two pairs of wheels, the two shafts 4 having cams 5, 5 and 6, and the arms 14 and 15 thereon, and the connecting-rods 16, of the brake-shoes 7 and 10, the sleeves 8 and rods 9, and means for rotating the shafts 4, substantially as described.

AUGUST RUTHENBERG.

Witnesses:
F. F. CHURCH,
G. A. RODA.